United States Patent
Choy et al.

(10) Patent No.: US 7,049,029 B2
(45) Date of Patent: *May 23, 2006

(54) NONAQUEOUS ELECTROLYTE COMPOSITION FOR IMPROVING OVERCHARGE SAFETY AND LITHIUM BATTERY USING THE SAME

(75) Inventors: Sang-hoon Choy, Daejeon (KR); Ho-sung Kim, Yongin (KR); Hee-young Sun, Yongin (KR); Hyeong-gon Noh, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 192 days.

This patent is subject to a terminal disclaimer.

(21) Appl. No.: 10/271,985

(22) Filed: Oct. 17, 2002

(65) Prior Publication Data

US 2003/0129499 A1    Jul. 10, 2003

(30) Foreign Application Priority Data

| Oct. 20, 2001 | (KR) | ............................... 2001-64938 |
| Oct. 20, 2001 | (KR) | ............................... 2001-64941 |
| Oct. 20, 2001 | (KR) | ............................... 2001-64942 |

(51) Int. Cl.
    *H01M 6/04*      (2006.01)

(52) U.S. Cl. ................. 429/200; 429/199; 429/231.95

(58) Field of Classification Search ................ 429/326, 429/327, 199, 200, 231.95, 247
See application file for complete search history.

(56) References Cited

U.S. PATENT DOCUMENTS

| 5,580,684 | A | 12/1996 | Yokoyama et al. |
| 5,709,968 | A | 1/1998 | Shimizu |
| 5,763,119 | A | 6/1998 | Adachi |
| 5,776,627 | A | 7/1998 | Mao et al. |
| 5,858,573 | A | 1/1999 | Abraham et al. |
| 6,921,612 | B1 | 7/2005 | Choy et al. |
| 2003/0059681 | A1 * | 3/2003 | Noh ........................... 429/306 |
| 2003/0118911 | A1 * | 6/2003 | Choy et al. ................. 429/326 |

FOREIGN PATENT DOCUMENTS

| CN | 1419310 A | 5/2003 |
| JP | 7-302614 | 11/1995 |
| JP | 2000-58116 | * 2/2000 |
| JP | 2001-15158 | 1/2001 |
| JP | 2001-23690 | * 1/2001 |
| WO | WO 02/47192 | * 6/2002 |
| WO | WO 2002047192 | * 6/2002 |

OTHER PUBLICATIONS

Office Actions issued by Korean Industrial Property Office on Jul. 9, 2003.
Office Action issued in Chinese Patent Application No. 02149566.1 on Jun. 17, 2005.

* cited by examiner

*Primary Examiner*—Laura Weiner
(74) *Attorney, Agent, or Firm*—Stein, McEwen & Bui, LLP

(57) ABSTRACT

A nonaqueous electrolyte for improving overcharge safety of a lithium battery using the same includes an organic solvent, a lithium salt, and a hydride of a compound represented by the Formula 1:

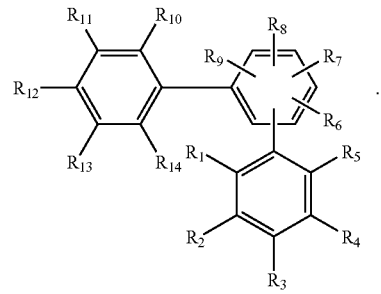

Formula 1

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, halogen, a substituted or unsubstituted C1–C20 alkyl, a substituted or unsubstituted C1–C20 alkoxy, nitro or amine group. The nonaqueous electrolyte forms a polymer due to its oxidative decomposition even if there is an increase in voltage due to overcharge of a battery by some uncontrollable conditions.

22 Claims, 9 Drawing Sheets

NONAQUEOUS ELECTROLYTE COMPOSITION FOR IMPROVING OVERCHARGE SAFETY AND LITHIUM BATTERY USING THE SAME

CROSS-REFERENCE TO RELATED APPLICATIONS

This application claims the benefit of Korean Application Nos. 2001-64938, 2001-64941, and 2001-64942, which were filed Oct. 20, 2001 in the Korean Intellectual Property Office, the disclosures of which are incorporated herein by reference.

BACKGROUND OF THE INVENTION

1. Field of the Invention

The present invention relates to a nonaqueous electrolyte which improves overcharge safety and a lithium battery using the same.

2. Description of the Related Art

Due to the development of advanced electronic devices, there is an increasing demand for small, lightweight portable electronic devices and equipment. Thus, there is a need for batteries having high energy density characteristics so as to supply power to such devices and equipment. Research into such lithium batteries is being aggressively pursued.

A lithium battery generally comprises a cathode, an anode, an electrolyte, which provides a movement path for lithium ions, and a separator disposed between the cathode and the anode. Lithium batteries produce electrical energy by intercalation/deintercalation of the lithium ions during oxidation and reduction occurring at the cathode and the anode. However, where a battery is overcharged due to a malfunction of a charger, for example, which causes a sharp rise in voltage, excess lithium is precipitated at the cathode and excess lithium is intercalated into the anode. If both the cathode and the anode are thermally unstable, an organic solvent of the electrolyte is decomposed so as to cause rapid heat generation, such as thermal runaway. This malfunction adversely affects battery safety.

To overcome the foregoing problem, various attempts have been proposed to suppress battery overcharge by changing the composition of an electrolyte or by adding additives to the electrolyte. For example, U.S. Pat. No. 5,580,684 discloses a method of improving battery safety by increasing a self-extinguishing property of an electrolyte through the addition of phosphoric acid esters, such as trimethyl phosphate, tri(trifluoroethyl)phosphate or tri(2-chloroethyl)phosphate, to the electrolyte. U.S. Pat. No. 5,776,627 discloses a method of enhancing battery safety by preventing a migration of lithium by adding additives such as thiophene, biphenyl or furan to be polymerized in the event of a failure of a battery, and by allowing a safety vent of the battery to be easily opened by the gas produced by the additives. Similarly, methods for enhancing battery safety are disclosed in U.S. Pat. Nos. 5,763,119, 5,709,968 and 5,858,573 in which an electrolyte includes additives such as 1,2-dimethoxy-4-bromo-benzene, 2-chloro-p-xyline and 4-chloro-anisol, and 2,7-diacetyl thianthrene, respectively. Also, Japanese Patent Laid-Open Publication No. Hei 7-302614 discloses a battery protecting method in which overcharge current is consumed by forming a polymer using a ter-phenyl benzene compound.

However, such conventional additives may be polymerized even under normal operating conditions or produce a large amount of gas due to an oxidative decomposition, resulting in a swelling of a battery. Also, use of such conventional additives may deteriorate various battery performance characteristics, such as formation, standard capacity or cycle life characteristics, making it difficult to put the additives into practical application.

SUMMARY OF THE INVENTION

To solve the above and other problems, it is an object of the present invention to provide a nonaqueous electrolyte which improves battery safety by suppressing risks of rupture, ignition or explosion of a battery when the battery is overcharged due to uncontrolled conditions such as a failure of a charger or when the battery is exposed to high temperatures, which suppresses swelling, and which prevents deterioration in formation, standard capacity and cycle life characteristics of the battery.

It is another object of the present invention to provide a lithium battery with improved overcharge safety.

Additional objects and advantages of the invention will be set forth in part in the description which follows and, in part, will be obvious from the description, or may be learned by practice of the invention.

To accomplish the above and other objects, the present invention provides a nonaqueous electrolyte according to an embodiment of the invention which includes an organic solvent, a lithium salt, and a hydride of a compound represented by Formula 1 which is as follows:

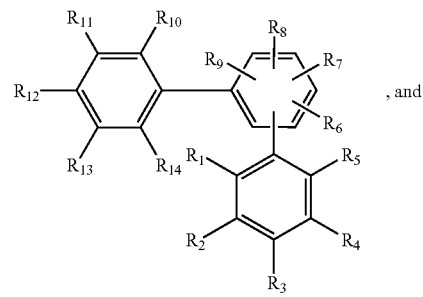

Formula 1 wherein $R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, hydroxy, halogen, a C1–C20 alkyl, a C1–C20 alkoxy, nitro or amine group.

In another embodiment of the present invention, the nonaqueous electrolyte further comprises the compound represented by the Formula 1.

In yet another embodiment of the present invention, the nonaqueous electrolyte further comprises a compound represented by the Formula 6, which is as follows:

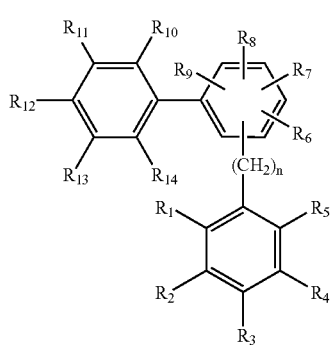

Formula 6 wherein $R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, hydroxy, halogen, a C1–C20 alkyl, a C1–C20 alkoxy, nitro or amine group, and n is an integer between 1 and 10.

In accordance with another aspect of the present invention, there is provided a nonaqueous electrolyte comprising an organic solvent, a lithium salt, and a hydride of a multiple-ring compound.

In accordance with still another embodiment of the present invention, there is provided a lithium secondary battery using the nonaqueous electrolyte.

BRIEF DESCRIPTION OF THE DRAWINGS

The above and other object and advantages of the present invention will become more apparent and more readily appreciated by describing in detail embodiments thereof with reference to the accompanying drawings in which.

DETAILED DESCRIPTION OF THE EMBODIMENTS

Figure 1:
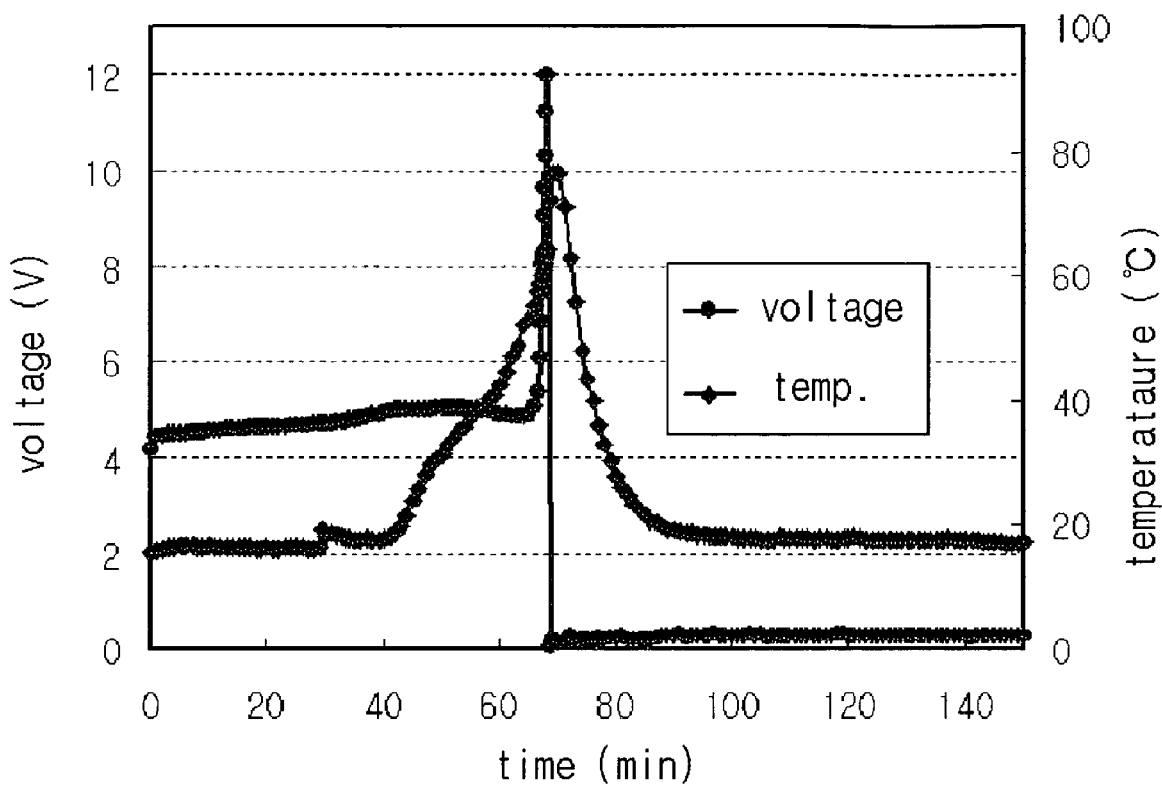
FIG. 1 is a graph showing the results of overcharge test for a lithium battery using an electrolyte prepared in Comparative Example 1.

Reference will now be made in detail to the present embodiments of the present invention, examples of which are illustrated in the accompanying drawings and in Specific Examples, wherein like reference numerals refer to the like elements throughout. The embodiments are described below in order to explain the present invention by referring to the figures and the Specific Examples.

The present invention provides a nonaqueous electrolyte comprising a hydride of a compound represented by Formula 1. Formula 1 is as follows:

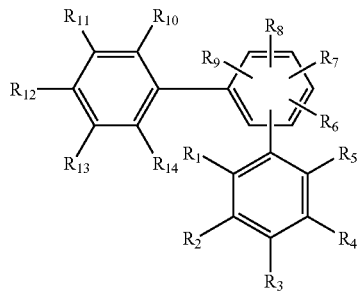

Formula 1

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, hydroxy, halogen, a substituted or unsubstituted C1–C20 alkyl, a substituted or unsubstituted C1–C20 alkoxy, nitro or amine group.

The hydride of the compound represented by the Formula 1 used as an additive to an electrolyte has little effect on battery performance under normal use conditions (i.e., at 2.75–4.2 V). During overcharge of the battery, however, the additive is oxidized to cause polymerization at the surface of a cathode and a coating is formed on the cathode surface. Accordingly, the cathode-anode resistance increases and the polymerizable coating having some ionic and conductive properties causes a soft short (shunting) effect between the cathode and the anode, consuming overcharge current and thereby protecting the battery.

In the hydride of the compound represented by the Formula 1, an oxidative decomposition potential of an electrolyte moves further in a positive (+) direction than in the unhydrogenated compound. Thus, unfavorable side effects, such as polymerization, which may occur when the battery is used for a long period of time at normal conditions, can be further suppressed, thereby ensuring overcharge safety of the battery while preventing deterioration of the formation, standard capacity, swelling and cycle life characteristics.

The hydride of the compound represented by the Formula 1 is used in an amount at or between 1 and 20% by weight, and preferably at or between 3 and 15% by weight, based on the total weight of a mixed solution of the organic solvent and the lithium salt. If the amount is less than 1%, desired effects are difficult to achieve. If the amount is greater than 20%, the cycle life characteristics undesirably deteriorate.

The compound represented by the Formula 1 has a substituted or unsubstituted phenyl group bound to a biphenyl group. The substituted or unsubstituted phenyl group may be introduced at any of ortho (o), meta (m) and para (p) positions of the biphenyl group, and preferably is at the o- or p-positions.

The compound with a phenyl substituted at the o-position is represented by Formula 2, which is as follows:

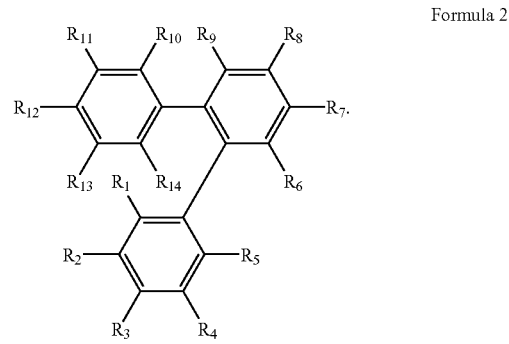

Formula 2

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, hydroxy, halogen, a substituted or unsubstituted C1–C20 alkyl, a substituted or unsubstituted C1–C20 alkoxy, nitro or amine group.

Examples of the compound represented by the Formula 2 include the o-terphenyl represented by Formula 3, which is as follows:

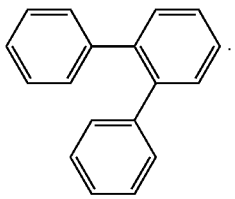

Formula 3

Also, the compound with a phenylalkyl substituted at the p-position is represented by Formula 4, which as follows:

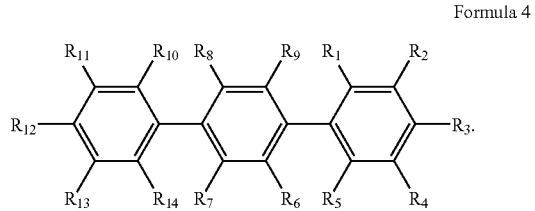

Formula 4

$R_1, R_2, R_3, R_4, R_5, R_6, R_7, R_8, R_9, R_{10}, R_{11}, R_{12}, R_{13}$ and $R_{14}$ are the same or different, and are independently hydrogen, hydroxy, halogen, a substituted or unsubstituted C1–C20 alkyl, a substituted C1–C20 alkoxy, nitro or amine group.

Examples of the compound represented by the Formula 4 include a p-benzyl biphenyl represented by Formula 5, which is as follows:

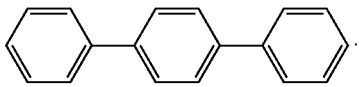

Formula 5

The compounds represented by the Formulas 1 through 5 are contained in an organic solvent in hydrogenated form to form the nonaqueous electrolytes. Accordingly, the oxidative decomposition potentials of the electrolytes move in a positive (+) direction, thereby maximally suppressing unfavorable side reactions at the battery regions. The degree of hydrogenation of the hydride of the compound represented by the Formula 1 is in a range at or between 10 and 70%, and preferably in the range at or between 30 and 50%. If the degree of hydrogenation is less than 10%, the desired effects are difficult to achieve. If the degree of hydrogenation is greater than 70%, the polymerization currents are undesirably reduced.

In an embodiment of the present invention, the nonaqueous electrolyte further comprises the compound represented by the Formula 1. In this embodiment, the nonaqueous electrolyte further includes a mixture of the compound represented by the Formula 1 and its hydride, in addition to the organic solvent and the lithium salt. The compound represented by the Formula 1, like the hydride thereof, has a substituted or unsubstituted phenyl group bound to a biphenyl group. The substituted or unsubstituted phenyl group may be introduced at any of the ortho (o), meta (m) and para (p) positions of the biphenyl group, and preferably at the o-position (as in the compound represented by the Formula 2), or at the p-position (as in the compound represented by the Formula 4).

The mixture of the compound represented by the Formula 1 and its hydride is contained in the nonaqueous electrolyte in an amount at or between 1 and 20% by weight, and preferably 3 to 15% by weight, based on a total weight of a mixed solution of the organic solvent and the lithium salt. If the amount is less than 1%, the desired effects are difficult to achieve. If the amount is greater than 20%, cycle life characteristics undesirably deteriorate.

The mixing ratio of the compound represented by the Formula 1 to its hydride in the mixture thereof is at or between 10 and 90% by weight, and preferably is at or between 30 and 70% by weight, based on the total weight of the mixture. If the mixing ratio is less than 10%, the cycle life characteristics may deteriorate. If the mixing ratio is greater than 90%, the degree of swelling undesirably increases.

In another embodiment of the present invention, the nonaqueous electrolyte further comprises a compound represented by Formula 6, which is as follows:

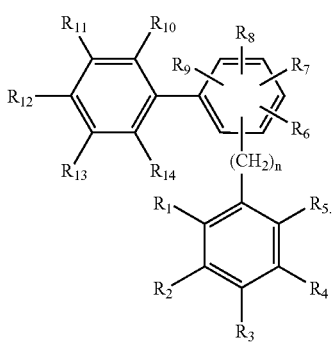

Formula 6

$R_1, R_2, R_3, R_4, R_5, R_6, R_7, R_8, R_9, R_{10}, R_{11}, R_{12}, R_{13}$ and $R_{14}$ are the same or different, and are independently hydrogen, hydroxy, halogen, a substituted or unsubstituted C1–C20 alkyl, a substituted or unsubstituted C1–C20 alkoxy, nitro or amine group, and n is an integer between 1 and 10.

The compound represented by the Formula 6 has a substituted or unsubstituted phenylalkyl group bound to a biphenyl group. The substituted or unsubstituted phenylalkyl group may be introduced at any of the ortho (o), meta (m) and para (p) positions of the biphenyl group, and preferably is at the o-position (as in the compound represented by Formula 7), or at the p-position (as in the compound represented by Formula 9). Formula 7 is as follows

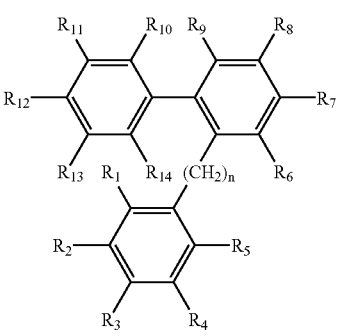

Formula 7

$R_1, R_2, R_3, R_4, R_5, R_6, R_7, R_8, R_9, R_{10}, R_{11}, R_{12}, R_{13}$ and $R_{14}$ are the same or different, and are independently hydrogen, hydroxy, halogen, a substituted or unsubstituted C1–C20 alkyl, a substituted or unsubstituted C1–C20 alkoxy, nitro or amine group, and n is an integer between 1 and 10.

Formula 9 is as follows:

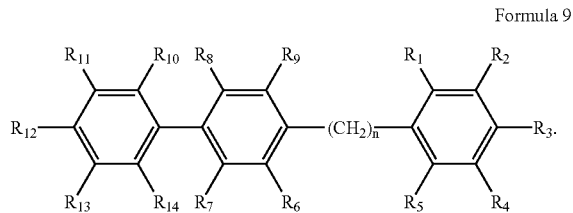

Formula 9

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, hydroxy, halogen, a substituted or unsubstituted C1–C20 alkyl, or a substituted or unsubstituted C1–C20 alkoxy, nitro or amine group, and n is an integer between 1 and 10.

Examples of the compound represented by the Formula 7 include a compound represented by Formula 8, which is as follows:

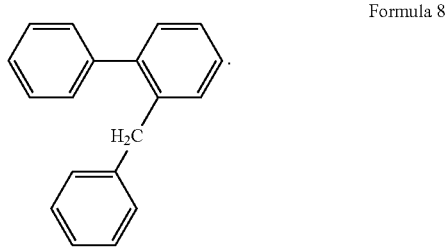

Formula 8

Examples of the compound represented by the Formula 9 include a compound represented by Formula 10, which is as follows:

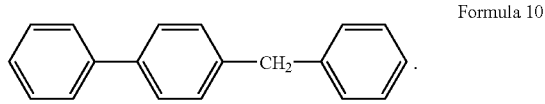

Formula 10

The mixture of the compound represented by the Formula 1 and the compound represented by the Formula 6 in the nonaqueous electrolyte is used in an amount at or between 1 and 20% by weight, and preferably is at or between 3 and 15% by weight, based on the total weight of a mixed solution of the organic solvent and the lithium salt. If the amount is less than 1%, the desired effects are difficult to achieve. If the amount is greater than 20%, the cycle life characteristics undesirably deteriorate.

The mixing ratio of the compound represented by the Formula 1 to the compound represented by the Formula 6 in the mixture thereof is at or between 10 and 90% by weight, and preferably is at or between 30 and 70% by weight, based on the total weight of the mixture. If the mixing ratio is less than 10%, the cycle life characteristics may deteriorate. If the mixing ratio is greater than 90%, the degree of swelling undesirably increases. The present invention further provides a nonaqueous electrolyte comprising an organic solvent, a lithium salt, and a hydride of a multiple-ring compound.

Preferably, the multiple-ring compound has phenyl ring.

Examples of the multiple-ring compound include a compound represented by the above formula 1 or 6, or a compound represented the following formula 11:

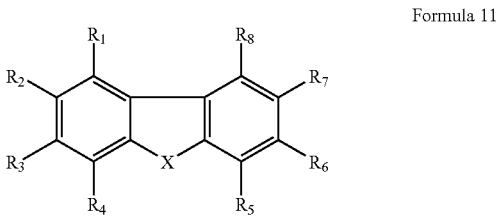

Formula 11 wherein $R_1$, $R_2$, $R_3$, $R_4$, $R_5$, $R_6$, $R_7$ and $R_8$ are the same or different, and are independently hydrogen, hydroxyl, halogen, a C1–C20 alkyl, a C1–C20 alkoxy, nitro or amine group, and —X— is —O—, —NR$_9$— or —S—, whrerein $R_9$ is hydrogen, hydroxyl, halogen, a C1–C20 alkyl, a C1–C20 alkoxy, nitro or amine group.

The alkyl used for the compound of the present invention includes a straight-chain or branched radical having 1–20 carbon atoms, preferably 1–12 carbon atoms, and more preferably, a lower alkyl radical having 1–6 carbon atoms. Examples of such a radical include methyl, ethyl, n-propyl, isopropyl, n-butyl, isobutyl, sec-butyl, t-butyl, pentyl, isoamyl, hexyl, octyl and the like, and preferably a lower alkyl radical having 1–3 carbon atoms.

The alkoxy used for the compound of the present invention includes a straight-chain or branched oxygen-containing radical having a C1–C20 alkyl, and preferably a lower alkoxy radical having 1–6 carbon atoms. Examples of such a radical include methoxy, ethoxy, propoxy, butoxy, t-butoxy and the like, and preferably a lower alkoxy radical having 1–3 carbon atoms. The alkoxy radical is further substituted with one or more halo atoms such as fluoro, chloro or bromo to provide a haloalkoxy radical, and preferably a lower haloalkoxy having 1–3 carbon atoms. Examples of such an haloalkoxy radical include fluoromethoxy, chloromethoxy, trifluoromethoxy, trifluoroethoxy, fluoroethoxy and fluoropropoxy and the like.

Any organic solvent useful for the electrolytes can be generally used in the manufacture of lithium batteries without particular limitation. Examples of the organic solvents include at least one selected from the group consisting of ethylene carbonate, propylene carbonate, dimethyl carbonate, diethyl carbonate, dipropyl carbonate, ethylmethyl carbonate, dimethyl sulfoxide, acetonitrile, dimethoxyethane, tetrahydrofuran, acetone, dimethylformamide, cyclohexanone, fluorobenzene and N-methyl-2-pyrrolidone. The content of the organic solvent is in a range typically used in the manufacture of lithium batteries.

Lithium salts useful for the electrolyte include, but are not limited to, any lithium compounds capable of being dissociated in an organic solvent to produce lithium ions. Examples include at least one ionic lithium salt selected from the group consisting of lithium perchloric acid (LiClO$_4$), lithium tetrafluoroboric acid (LiBF$_4$), lithium hexafluorophosphoric acid (LiPF$_6$), lithium trifluoromethanesulfonic acid (LiCF$_3$SO$_3$) and lithium bis(trifluoromethanesulfonyl)amide (LiN(CF$_3$SO$_2$)$_2$). The content of the lithium salt is in a range typically used in the manufacture of lithium batteries. The organic electrolyte containing an inorganic salt serves as a path for moving the lithium ions in a direction of current flow.

The defined electrolyte can be used for any method of manufacturing lithium batteries without limitation. Exemplary manufacturing methods are as follows:

(1) An electrode assembly including an anode, a cathode, and a separator is put into a battery case and the electrolyte according to the present invention is inserted into the electrode assembly, thereby completing a lithium battery;

(2) A polymer electrolyte prepared by mixing a matrix-forming polymer resin and the electrolyte according to the present invention is applied to an electrode (i.e., a cathode or an anode) or a separator, the cathode, anode and separator are combined to form an electrode assembly, and the electrode assembly is put into a battery case, thereby completing a lithium battery; or (3) A polymer electrolyte composition comprising a prepolymer or polymerizable monomer as a matrix-forming resin and an electrolyte according to the present invention, is applied to an electrode (i.e., a cathode or an anode) or a separator, the cathode, anode and separator are combined to form an electrode assembly, the electrode assembly is put into a battery case and then polymerization is carried out, thereby completing a lithium battery.

Any separator that can be generally used in the manufacture of lithium batteries is used without any limitations. Examples thereof include a polyethylene or polypropylene porous layer less reactive with an organic solvent and suitable for attaining a safe battery. Examples of the matrix forming polymer resin include, but are not limited to, any material useful for a binder of an electrode plate. Examples include a vinylidenefluoride/hexafluoropropylene copolymer, polyvinylidenefluoride, polyacrylonitrile, polymethylmethacrylate and mixtures thereof.

The polymer electrolyte may further include a polymer filler, which enhances the mechanical strength of the polymer electrolyte. Examples of the filler include silica, kaolin and alumina.

The polymer electrolyte may further include a plasticizer. Examples of the plasticizer include ethylene glycol derivatives, oligomers thereof and organic carbonates. Examples of the ethylene glycol derivatives include ethylene glycol diacetate, ethylene glycol dibutylether, ethylene glycol dibutyrate, ethylene glycol dipropionate, propylene glycol methyletheracetate and mixture thereof. Examples of the organic carbonates include ethylene carbonate, propylene carbonate, diethyl carbonate, dimethyl carbonate, and mixtures thereof.

The lithium battery containing the electrolyte according to the present invention is not particularly limited in its type, and the present invention can be applied to primary batteries, secondary batteries or lithium sulfur batteries. The lithium battery containing the electrolyte according to the present invention is not further particularly limited in its shape, and the present invention can be applied to both rectangular and cylindrical batteries.

To further illustrate the present invention in greater detail, the following Examples will be given. However, it is to be understood that the present invention is not restricted thereto.

Preparation of the Cathode

A mixture (slurry or paste) was prepared by dissolving LiCoO$_2$, which is used as a cathode active material, Super-P (manufactured by M.M.M. Corp.), which is used as a conductive agent, and polyvinylidenefluoride (PVDF), which is used as a binder in N-methyl-2-pyrrolidone (NMP) which is used as an organic solvent. The mixture was uniformly applied onto both surfaces of an aluminum current collector to prepare a cathode coated with an active material. The cathode was dried to remove the organic solvent and compression molded using a roll press machine, thereby manufacturing a cathode having a 0.147 mm thickness.

Manufacture of the Anode

A mixture (slurry or paste) was prepared by dissolving mesocarbon fiber (MCF) (manufactured by PETOCA LTD.), which is used as an anode active material, and PVDF, which is used as a binder in NMP which is used as an organic solvent. The mixture was applied onto both surfaces of a copper current collector to prepare an anode coated with an active material. The anode was dried to remove the organic solvent and compression molded using a roll press machine, thereby manufacturing an anode having a 0.178 mm thickness.

Preparation of the Electrode Assembly

The manufactured cathode and anode were stacked with a polyethylene porous layer disposed therebetween. The polyethylene porous layer is less reactive with an organic solvent and is suitably thick (i.e., 0.025 mm). As such, a rectangular battery was fabricated having a capacity of approximately 900 mAh.

Preparation of the Electrolyte

EXAMPLE 1

LiPF$_6$ as a lithium salt was dissolved to a final concentration of 1.15M in a mixed solvent of ethylene carbonate (EC)/ethylmethyl carbonate (EMC)/propylene carbonate (PC)/fluorobenzene (FB) (volume ratio=30/55/5/10) to obtain a mixed solution. 5% by weight of a hydride of o-terphenyl represented by the Formula 3 (30% in degree of hydrogenation, manufactured by NIPPON STEEL CHEMICAL CO.), based on the total amount of the mixed solution, was added to the mixed solution, thereby obtaining a desired electrolyte.

Formula 3 is as follows:

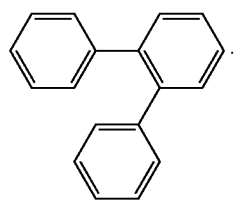

Formula 3

EXAMPLE 2

LiPF$_6$ as a lithium salt was dissolved to a final concentration of 1.15M in a mixed solvent of EC/EMC/PC/FB (volume ratio=30/55/5/10) to obtain a mixed solution. 5% by weight of a hydride of o-terphenyl represented by the Formula 3 (50% in degree of hydrogenation, manufactured by NIPPON STEEL CHEMICAL CO.), based on the total amount of the mixed solution, was added to the mixed solution, thereby obtaining a desired electrolyte.

EXAMPLE 3

LiPF$_6$ as a lithium salt was dissolved to a final concentration of 1.15M in a mixed solvent of EC/EMC/PC/FB (volume ratio=30/55/5/10) to obtain a mixed solution. 10% by weight of a hydride of o-terphenyl represented by the Formula 3 (50% in degree of hydrogenation, manufactured by NIPPON STEEL CHEMICAL CO.), based on the total amount of the mixed solution, was added to the mixed solution, thereby obtaining a desired electrolyte.

EXAMPLE 4

$LiPF_6$ as a lithium salt was dissolved to a final concentration of 1.15M in a mixed solvent of EC/EMC/PC/FB (volume ratio=30/55/5/10) to obtain a mixed solution. 5% by weight of a mixture of o-terphenyl represented by the Formula 3 (manufactured by NIPPON STEEL CHEMICAL CO.) and its hydride (30% in degree of hydrogenation, manufactured by NIPPON STEEL CHEMICAL CO.) (weight ratio=1:1), was added to the mixed solution, thereby obtaining a desired electrolyte.

EXAMPLE 5

$LiPF_6$ as a lithium salt was dissolved to a final concentration of 1.15M in a mixed solvent of EC/EMC/PC/FB (volume ratio=30/55/5/10) to obtain a mixed solution. 5% by weight of a mixture of o-terphenyl represented by the Formula 3 (manufactured by NIPPON STEEL CHEMICAL CO.) and its hydride (50% in degree of hydrogenation, manufactured by NIPPON STEEL CHEMICAL CO.) (weight ratio=1:1), was added to the mixed solution, thereby obtaining a desired electrolyte.

EXAMPLE 6

$LiPF_6$ as a lithium salt was dissolved to a final concentration of 1.15M in a mixed solvent of EC/EMC/PC/FB (volume ratio=30/55/5/10) to obtain a mixed solution. 10% by weight of a mixture of o-terphenyl represented by the Formula 3 (manufactured by NIPPON STEEL CHEMICAL CO.) and its hydride (50% in degree of hydrogenation, manufactured by NIPPON STEEL CHEMICAL CO.) (weight ratio=1:1), was added to the mixed solution, thereby obtaining a desired electrolyte.

EXAMPLE 7

$LiPF_6$ as a lithium salt was dissolved to a final concentration of 1.15M in a mixed solvent of EC/EMC/PC/FB (volume ratio=30/55/5/10) to obtain a mixed solution. 10% by weight of a mixture of o-benzyl biphenyl represented by the Formula 8 (manufactured by NIPPON STEEL CHEMICAL CO.) and a hydride of o-terphenyl represented by the Formula 3 (30% in degree of hydrogenation, manufactured by NIPPON STEEL CHEMICAL CO.) (weight ratio=1:1), was added to the mixed solution, thereby obtaining a desired electrolyte.

Formula 8 is as follows:

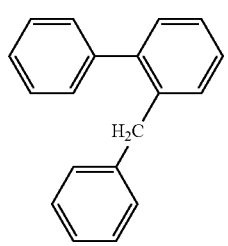

Formula 8

EXAMPLE 8

$LiPF_6$ as a lithium salt was dissolved to a final concentration of 1.15M in a mixed solvent of EC/EMC/PC/FB (volume ratio=30/55/5/10) to obtain a mixed solution. 5% by weight of a mixture of o-benzyl biphenyl represented by the Formula 8 (manufactured by NIPPON STEEL CHEMICAL CO.) and a hydride of o-terphenyl represented by the Formula 3 (50% in degree of hydrogenation, manufactured by NIPPON STEEL CHEMICAL CO.) (weight ratio=1:1), was added to the mixed solution, thereby obtaining a desired electrolyte.

EXAMPLE 9

$LiPF_6$ as a lithium salt was dissolved to a final concentration of 1.15M in a mixed solvent of EC/EMC/PC/FB (volume ratio=30/55/5/10) to obtain a mixed solution. 10% by weight of a mixture of o-benzyl biphenyl represented by the Formula 8 (manufactured by NIPPON STEEL CHEMICAL CO.) and a hydride of o-terphenyl represented by the Formula 3 (50% in degree of hydrogenation, manufactured by NIPPON STEEL CHEMICAL CO.) (weight ratio=1:1), was added to the mixed solution, thereby obtaining a desired electrolyte.

COMPARATIVE EXAMPLE 1

$LiPF_6$ as a lithium salt was mixed to a final concentration of 1.15M in a mixed solvent of EC/EMC/PC/FB (volume ratio=30/55/5/10) to obtain a desired electrolyte.

COMPARATIVE EXAMPLE 2

$LiPF_6$ as a lithium salt was mixed to a final concentration of 1.15M in a mixed solvent of EC/EMC/PC/FB (volume ratio=30/55/5/10) to obtain a mixed solution. To the mixed solution was added 5% by weight of o-terphenyl represented by the Formula 3, thereby obtaining a desired electrolyte.

Preparation of the Lithium Ion Battery

A separator was disposed between adjacent surfaces of the positive and negative electrodes to prepare an electrode assembly. The resultant structure was wound, compressed, and placed into a 34 mm×50 mm×6 mm rectangular can. Each of the obtained electrolytes was injected into the corresponding can having the electrode assembly, thereby preparing the lithium ion batteries.

TEST EXAMPLE 1

Overcharge Test

The prepared lithium ion batteries were charged with a charging current of 950 mA (1 C) at room temperature to a voltage of 4.2 V, and charged for 3 hours at a constant voltage of 4.2 V to reach a fully charged state. Overcharging was performed by applying a charging current of 950 mA (1 C) between the cathode and the anode of each fully charged battery for approximately 2.5 hours. Changes in the charging voltage and the temperature were observed.

FIG. 1 shows overcharge test results on the lithium ion battery prepared in Comparative Example 1 with a charging current of 950 mA (1 C). As shown in FIG. 1, when an external voltage of 12 V was applied, the separator shutdown may have resulted from an exhaustion of electrolyte or a temperature rise due to the oxidation between the cathode/anode and the electrolyte. Also, when a high current of approximately 1 C is applied to the lithium ion battery, thermal runaway occurs to the battery to cause the dissolution of the separator, resulting in an internal short, and heat or fire.

Figure 2:
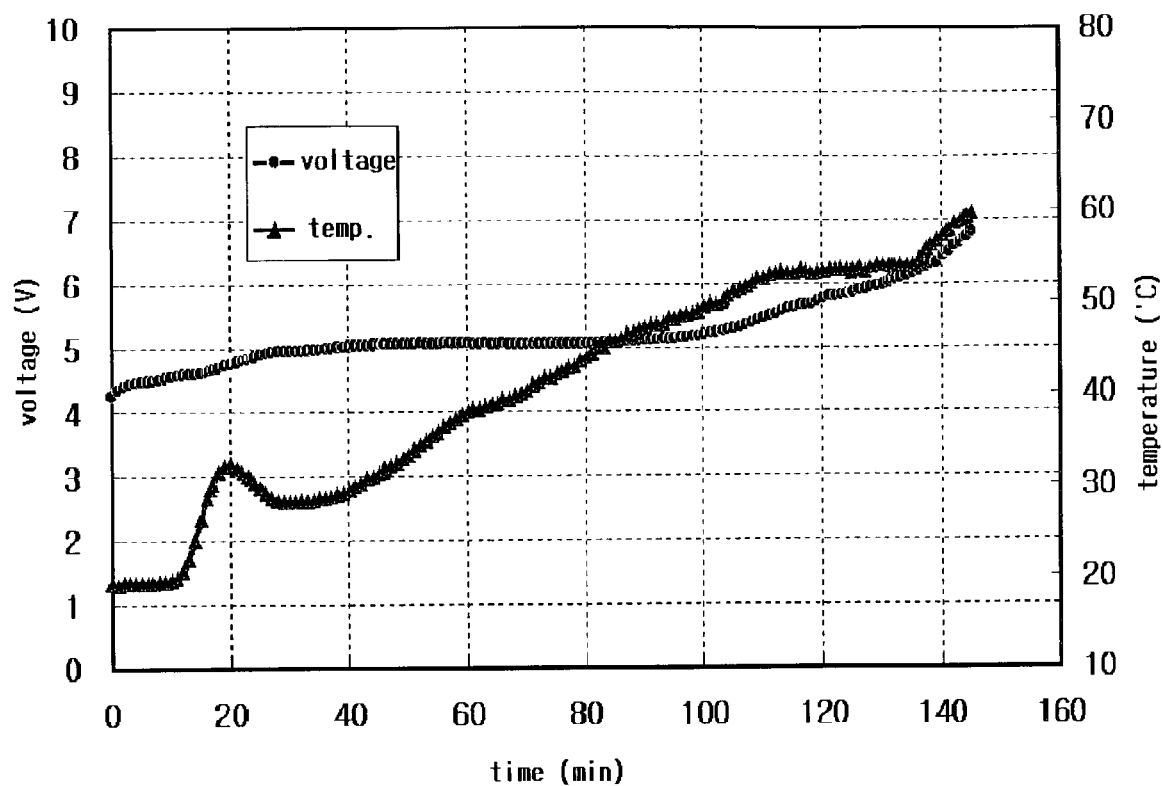
FIG. 2 is a graph showing the results of overcharge test for a lithium battery using an electrolyte prepared in Example 1 of the present invention.
Figure 3:
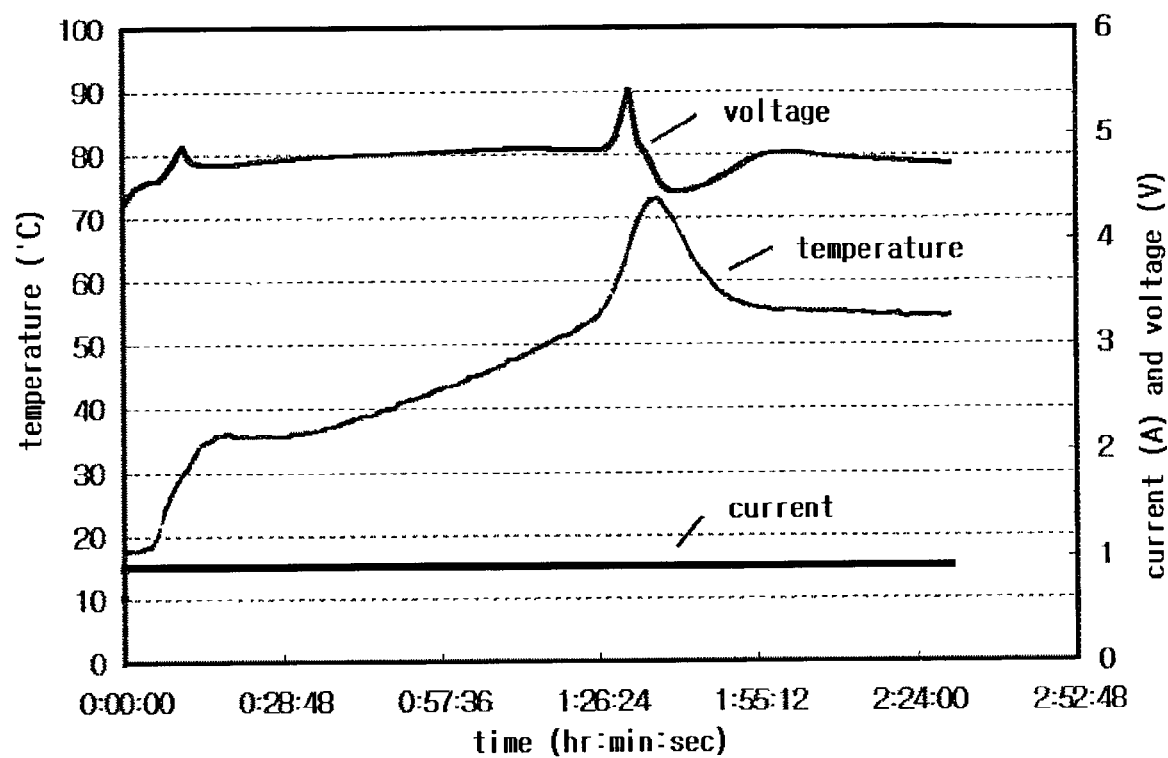
FIG. 3 is a graph showing the results of overcharge test for a lithium battery using an electrolyte prepared in Example 4 of the present invention.
Figure 4:
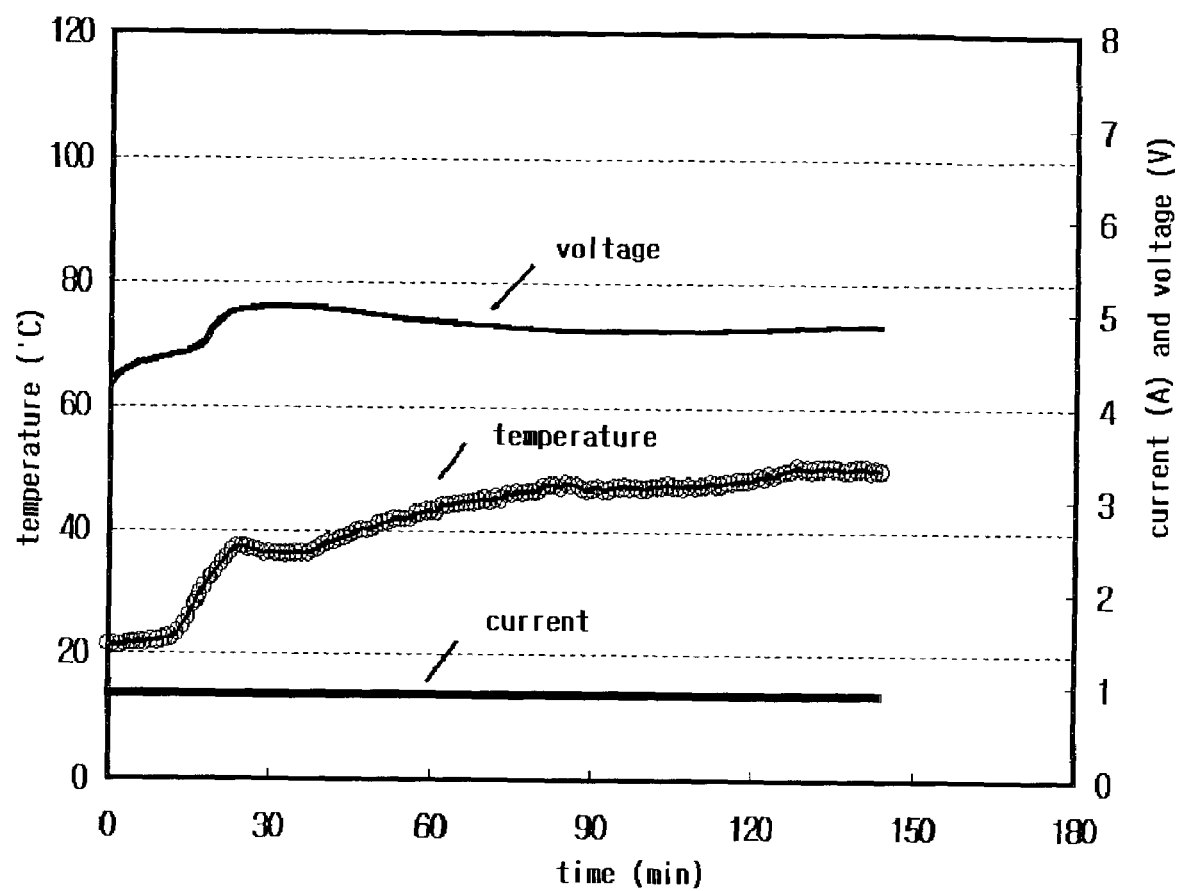
FIG. 4 is a graph showing the results of overcharge test for a lithium battery using an electrolyte prepared in Example 7 of the present invention.

FIGS. 2, 3 and 4 show the overcharge test results performed on the lithium ion battery prepared in Examples 1, 4 and 7 under the same conditions as in Comparative Example 1. As shown in the drawings, the polymerization takes place due to an additive of the present invention approximately 10 minutes after the overcharge test, so that the temperature rises. However, since the overcharging current is continuously consumed, a voltage rise is suppressed at approximately 5 V. Also, since the heat generation due to oxidative decomposition of an electrolyte and battery materials is also suppressed, the temperature of a battery surface is controlled to be approximately 50° C. or below. Since thermal runaway is fundamentally suppressed, battery safety can be ensured.

TEST EXAMPLE 2

Formation and Swelling Characteristics

Observations of the formation capacity, the standard capacity and the swelling characteristics before and after formation were carried out on the batteries prepared in Examples 1–9 and Comparative Examples 1 and 2. The observation results are listed in Table 1. The batteries were charged at 0.2 C to a voltage of 4.2 V and then were discharged at 0.2 C to an end voltage of 2.75 V. To determine the swelling characteristics, thicknesses of the batteries were measured.

TABLE 1

| | Swelling before and after formation (mm) | Formation capacity (mAh) | | | Standard capacity (mAh) |
|---|---|---|---|---|---|
| | | Charge | Discharge | Efficiency (%) | |
| Example 1 | 5.16 | 992 | 900 | 91 | 927 |
| Example 2 | 5.13 | 1000 | 922 | 92 | 938 |
| Example 3 | 5.10 | 980 | 910 | 93 | 920 |
| Example 4 | 5.30 | 950 | 900 | 94 | 920 |
| Example 5 | 5.25 | 970 | 920 | 95 | 930 |
| Example 6 | 5.41 | 990 | 911 | 92 | 924 |
| Example 7 | 5.10 | 960 | 920 | 96 | 950 |
| Example 8 | 5.08 | 970 | 925 | 95 | 955 |
| Example 9 | 5.32 | 980 | 920 | 94 | 935 |
| Comparative Example 1 | 5.09 | 958 | 883 | 92 | 934 |
| Comparative Example 2 | 5.75 | 939 | 865 | 92 | 851 |

As shown in Table 1, in view of the degree of swelling, the lithium battery prepared in Comparative Example 2 with a conventional overcharge preventing additive, is higher than that prepared in Comparative Example 1 without an overcharge preventing additive. This result is because a large amount of gas is produced due to oxidative decomposition of the overcharge preventing additive. However, the lithium batteries prepared in Examples 1–9, in which the overcharge preventing additives of the present invention are used, show substantially the same degree of swelling as compared to the lithium battery prepared in Comparative Example 1. That is to say, the additives of the present invention suppress swelling. The lithium batteries according to the present invention are also highly effective in view of formation and standard capacity characteristics.

TEST EXAMPLE 3

Cycle Life Characteristics

The charge/discharge cycle life characteristics were tested on the lithium batteries prepared in Example 2 and Comparative Example 2. The charge/discharge cycling tests were carried out under the conditions of a constant current and a constant voltage at 1 C and to 2.7–4.2 V. The constant voltage period was 1/10 the constant current period. The capacity and charge/discharge cycle life characteristics of the batteries are shown in FIG. 5.

Figure 5:
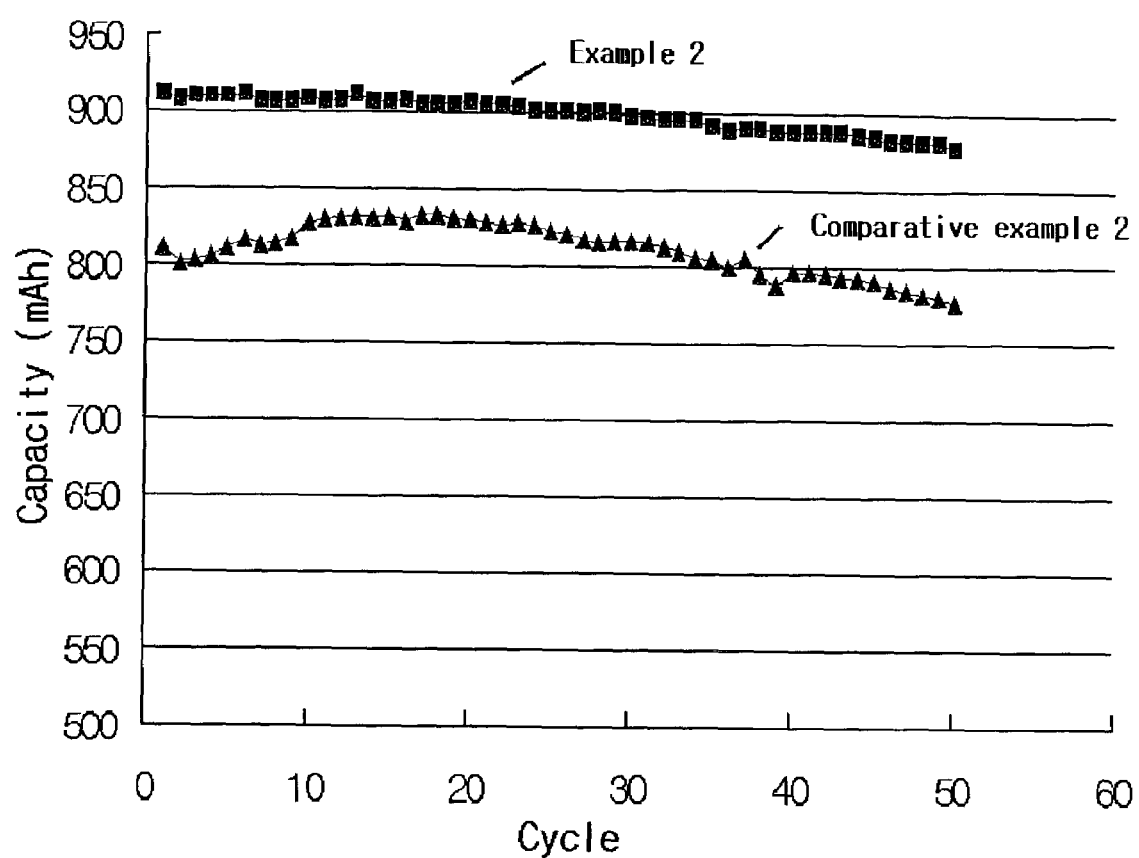
FIG. 5 shows cycle life characteristics of a lithium batteries using electrolytes prepared in Example 2 of the present invention and Comparative Example 2.

As shown in FIG. 5, the lithium battery using the overcharge preventing additive of Example 2 was proven to have higher capacity after 50 cycles, that is, better cycle life characteristics, than the lithium battery using the conventional overcharge preventing additive.

Figure 6:
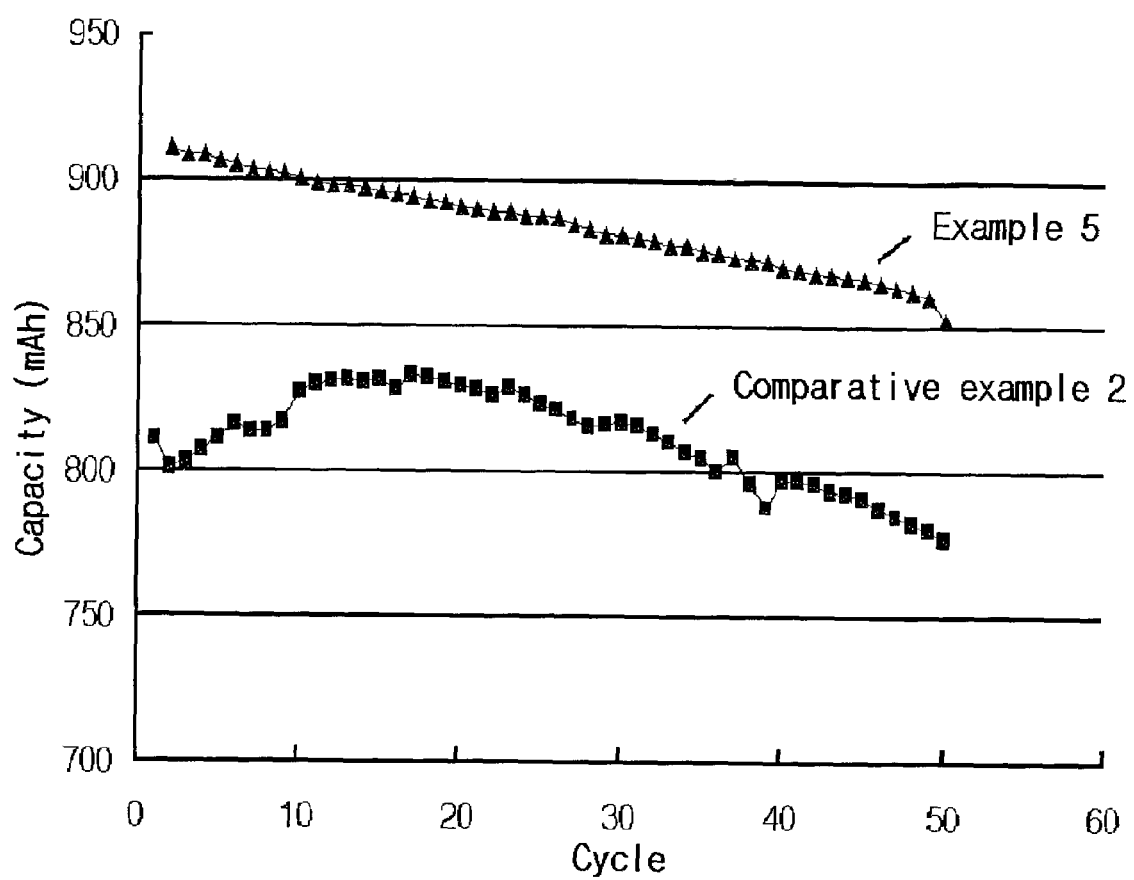
FIG. 6 shows cycle life characteristics of a lithium batteries using electrolytes prepared in Example 5 of the present invention and Comparative Example 2.

Likewise, the charge/discharge cycle life characteristics were tested on the lithium batteries prepared in Example 5 and Comparative Example 2, and the results thereof are shown in FIG. 6. As shown in FIG. 6, the lithium battery prepared in Example 5 showed improvement in the cycle life characteristics.

Figure 7:
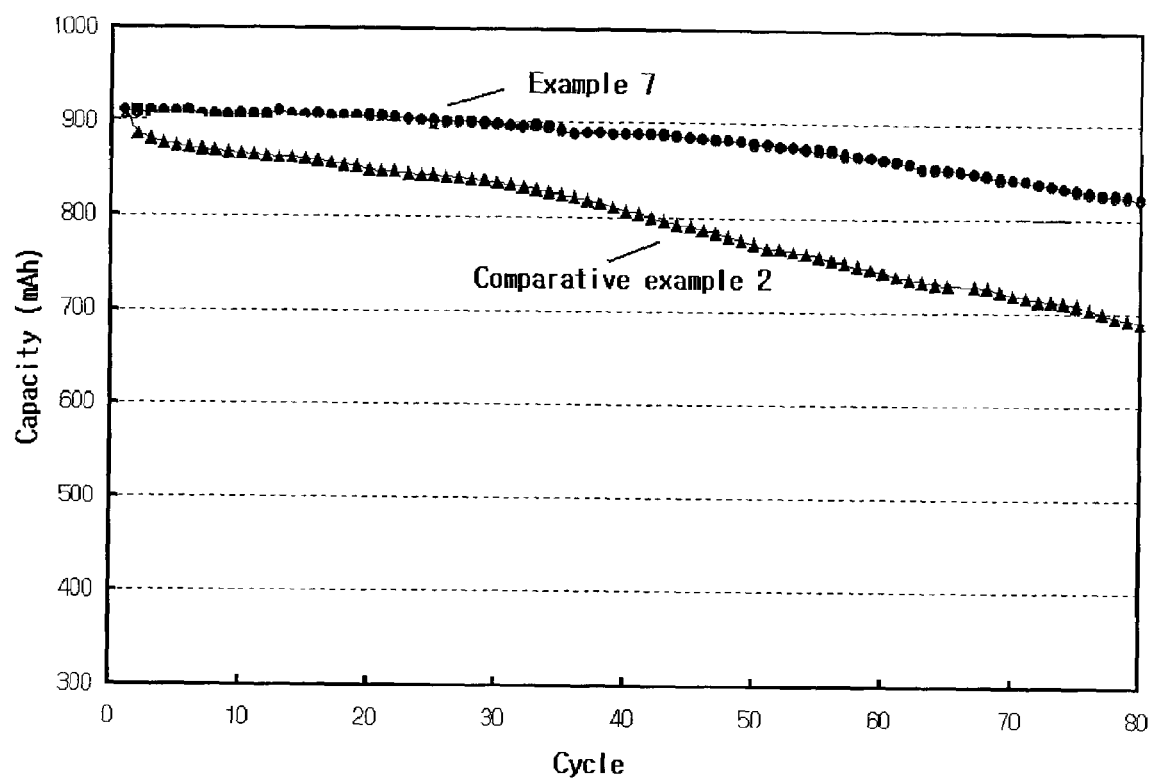
FIG. 7 shows cycle life characteristics of a lithium batteries using electrolytes prepared in Example 7 of the present invention and Comparative Example 2.

Also, the charge/discharge cycle life characteristics were tested on the lithium batteries prepared in Example 7 and Comparative Example 2, and the results thereof are shown in FIG. 7. As shown in FIG. 7, the lithium battery prepared in Example 7 showed improvement in the cycle life characteristics.

TEST EXAMPLE 4

Measurement of Oxidative Decomposition Potential

Figure 8:
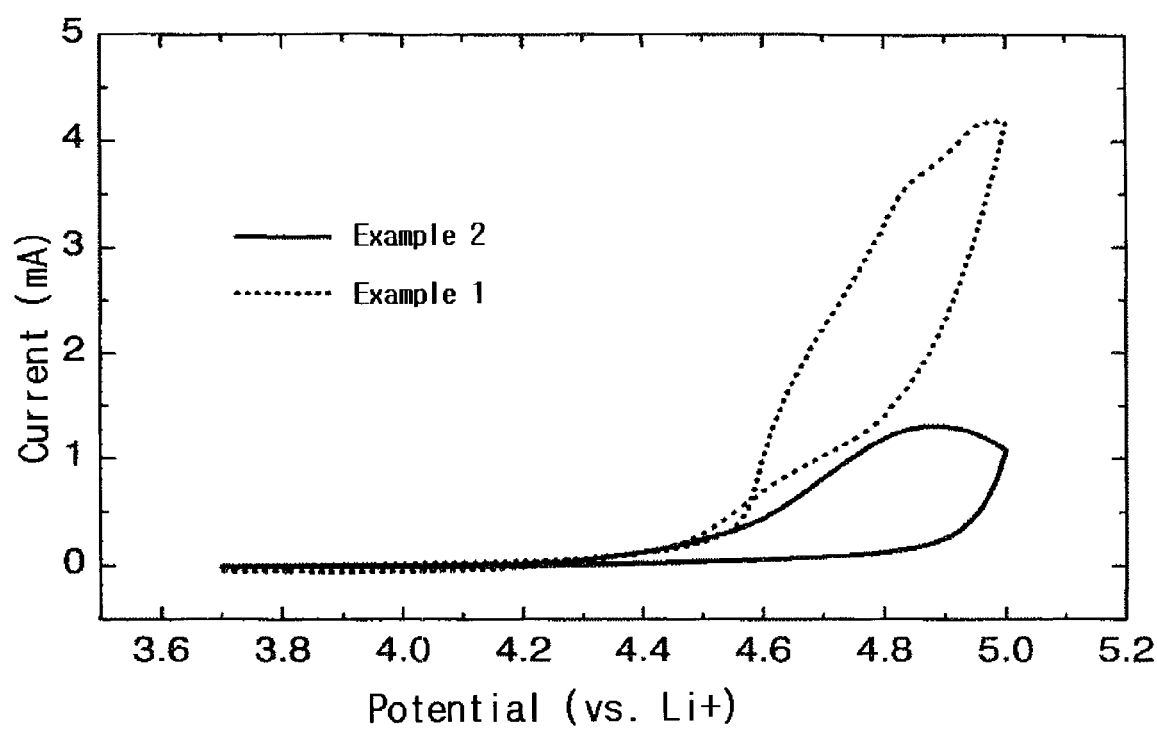
FIG. 8 shows oxidative decomposition potentials of lithium batteries using electrolytes prepared in Examples 1 and 2.

The oxidative decomposition potentials of the lithium batteries prepared in Examples 1 and 2 were measured, and the results thereof are shown in FIG. 8. As shown in FIG. 8, the lithium batteries according to the present invention experienced little oxidative decomposition in a battery use area. Also, it was confirmed that an oxidation start potential moved in a positive (+) direction as hydrogenation proceeded.

Figure 9:
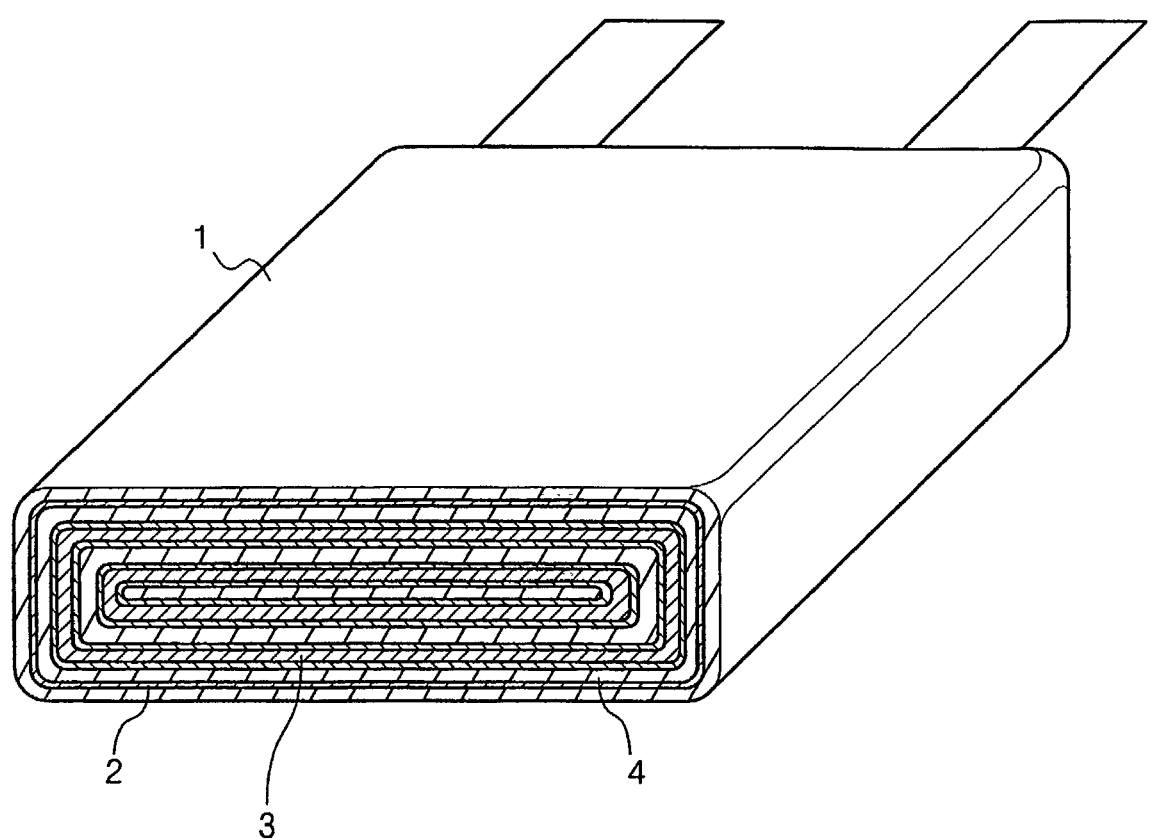
FIG. 9 shows a lithium battery according to an embodiment of the present invention.

As shown in FIG. 9, a lithium battery according to an embodiment of the present invention includes a case 1 containing a positive electrode (i.e., a cathode) 3, a negative electrode (i.e., an anode) 4, and a separator 2 interposed between the positive electrode 3 and the negative electrode 4. The electrolyte of the present invention is disposed between the positive and negative electrodes 3, 4. It is understood that, where the electrolyte is a polymer electrolyte, that the polymer electrolyte can be used as the separator 2.

As described above, the nonaqueous electrolyte according to the present invention forms a polymer due to its oxidative decomposition even if there is an increase in voltage due to overcharge of a battery by uncontrollable conditions, so that an overcharge current is continuously consumed, thereby protecting the battery. Therefore, the overcharge safety of the battery can be enhanced, and swelling is reduced. Also, there is prevented a deterioration in the formation, standard capacity and cycle life characteristics. Further, the nonaqueous electrolyte according to the present invention can be advantageously applied to lithium batteries and the like.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A nonaqueous electrolyte comprising:
an organic solvent;
a lithium salt; and
a hydride of a compound represented by Formula 1, wherein Formula 1 is

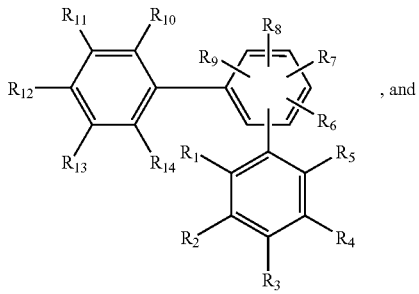

, and $R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, hydroxy, halogen, a substituted or unsubstituted C1–C20 alkyl, a substituted or unsubstituted C1–C20 alkoxy, nitro or amine group, wherein a degree of hydrogenation of the hydride of the compound represented by the Formula 1 is at or between 10 and 70%.

2. The nonaqueous electrolyte according to claim 1, wherein an amount of the compound represented by the Formula 1 is at or between 1 and 20% by weight based on a total amount of a mixed solution of the organic solvent and the lithium salt.

3. The nonaqueous electrolyte according to claim 1, wherein the hydride of the compound represented by the Formula 1 is a hydride of a compound represented by Formula 2, where:
the Formula 2 is

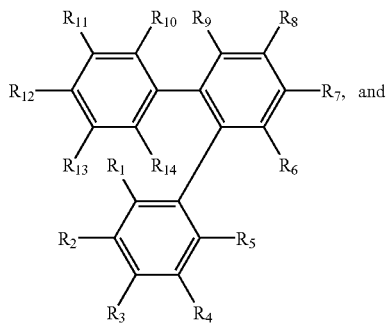

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, hydroxy, halogen, a substituted or unsubstituted C1–C20 alkyl, a substituted or unsubstituted C1–C20 alkoxy, nitro or amine group.

4. The nonaqueous electrolyte according to claim 3, wherein the hydride of the compound represented by the Formula 2 is a hydride of an o-terphenyl represented by Formula 3, where the Formula 3 is

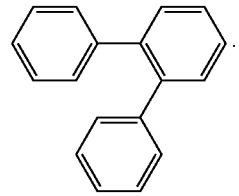

5. The nonaqueous electrolyte according to claim 1, wherein the hydride, which is hydrogenated from the compound represented by the Formula 1 is a hydride of a compound represented by Formula 4, where the Formula 4 is

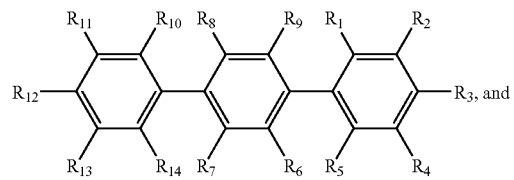

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, halogen, a substituted or unsubstituted C1–C20 alkyl, a substituted or unsubstituted C1–C20 alkoxy, nitro or amine group.

6. The nonaqueous electrolyte according to claim 5, wherein the hydride of the compound represented by the Formula 4 is a hydride of a p-benzyl biphenyl represented by Formula 5, where the Formula 5 is

7. The nonaqueous electrolyte according to claim 1, wherein a mixing ratio of the compound represented by the Formula 1 to the hydride of the compound represented by the Formula 1 in the mixture thereof is at or between 10 and 90% by weight, based on a total weight of the mixture.

8. The nonaqueous electrolyte according to claim 1, further comprising:
a compound represented by the Formula 6, wherein the Formula 6 is

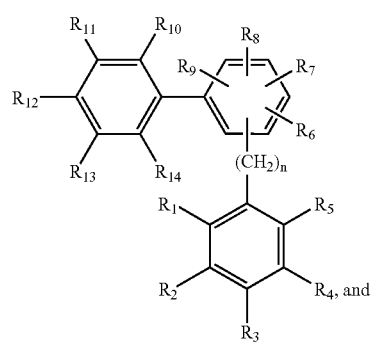

$R_1, R_2, R_3, R_4, R_5, R_6, R_7, R_8, R_9, R_{10}, R_{11}, R_{12}, R_{13}$ and $R_{14}$ are the same or different, and are independently hydrogen, halogen, a substituted or unsubstituted C1–C20 alkyl, a substituted or unsubstituted C1–C20 alkoxy, nitro or amine group, and n is an integer between 1 and 10.

9. The nonaqueous electrolyte according to claim 8, wherein the compound represented by the Formula 6 is a compound represented by the Formula 8 or 10, where:

the Formula 8 is

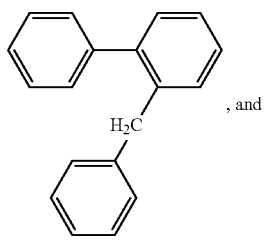

, and

Formula 10 is

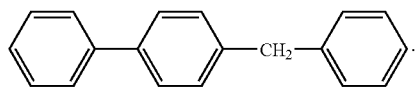

10. The nonaqueous electrolyte according to claim 8, wherein an amount of a mixture of the compound represented by the Formula 1 and the compound represented by the Formula 6 is at or between 1 and 20% by weight based on the total amount of a mixed solution of the organic solvent and the lithium salt.

11. The nonaqueous electrolyte according to claim 8, wherein a mixing ratio of the compound represented by the Formula 1 to the compound represented by the Formula 6 in the mixture thereof is at or between 10 and 90% by weight, based on a total weight of the mixture.

12. A lithium battery comprising:
an anode;
a cathode which intercalates lithium ions with the anode;
a separator disposed between the anode and the cathode; and
a nonaqueous electrolyte disposed between the anode and the cathode, the nonaqueous electrolyte comprising:
an organic solvent;
a lithium salt; and
a hydride, which is hydrogenated from a compound represented by Formula 1,
wherein the Formula 1 is

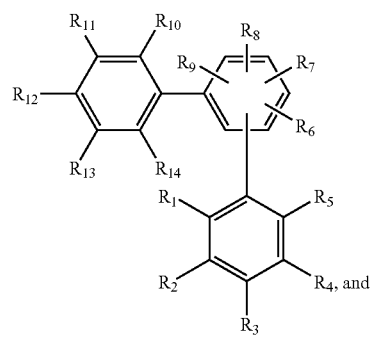

$R_1, R_2, R_3, R_4, R_5, R_6, R_7, R_8, R_9, R_{10}, R_{11}, R_{12}, R_{13}$ and $R_{14}$ are the same or different, and are independently hydrogen, hydroxy, halogen, a substituted or unsubstituted C1–C20 alkyl, a substituted or unsubstituted C1–C20 alkoxy, nitro or amine group, wherein a degree of hydrogenation of the hydride of the compound represented by the Formula 1 is at or between 10 and 70%.

13. The lithium battery of claim 12, wherein an amount of the compound represented by the Formula 1 is at or between 1 and 20% by weight based on a total amount of a mixed solution of the organic solvent and the lithium salt.

14. The lithium battery of claim 12, wherein the hydride of the compound represented by the Formula 1 is a hydride of a compound represented by Formula 2, where:

the Formula 2 is

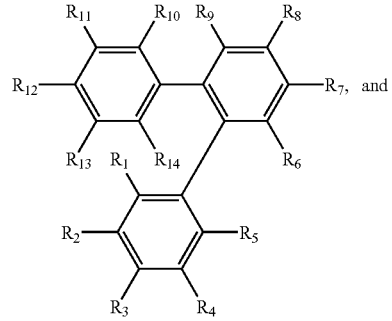

$R_1, R_2, R_3, R_4, R_5, R_6, R_7, R_8, R_9, R_{10}, R_{11}, R_{12}, R_{13}$ and $R_{14}$ are the same or different, and are independently hydrogen, hydroxy, halogen, a substituted or unsubstituted C1–C20 alkyl, a substituted or unsubstituted C1–C20 alkoxy, nitro or amine group.

15. The lithium battery of claim 14, wherein the hydride of the compound represented by the Formula 2 is a hydride of an o-terphenyl represented by Formula 3, where the Formula 3 is

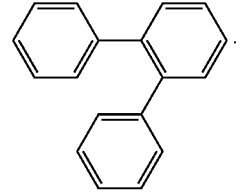

16. The lithium battery of claim 12, wherein the hydride of the compound represented by the Formula 1 is a hydride of a compound represented by Formula 4, where the Formula 4 is

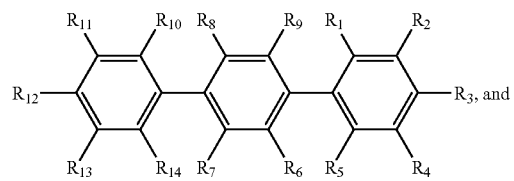

$R_1, R_2, R_3, R_4, R_5, R_6, R_7, R_8, R_9, R_{10}, R_{11}, R_{12}, R_{13}$ and $R_{14}$ are the same or different, and are independently hydrogen, halogen, a substituted or unsubstituted C1–C20 alkyl, a substituted or unsubstituted C1–C20 alkoxy, nitro or amine group.

17. The lithium battery of claim 16, wherein the hydride of the compound represented by the Formula 4 is a hydride of a p-benzyl biphenyl represented by Formula 5, where the Formula 5 is

18. The lithium battery of claim 12, further comprising:
a compound represented by Formula 6, wherein the Formula 6 is

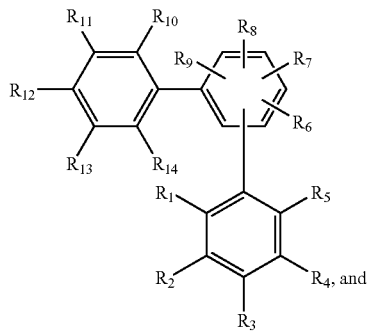

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, halogen, a substituted or unsubstituted C1–C20 alkyl, a substituted or unsubstituted C1–C20 alkoxy, nitro or amine group, and n is an integer between 1 and 10, and wherein the compound represented by the Formula 6 is a compound represented by Formula 8 or 10, where:
the Formula 8 is

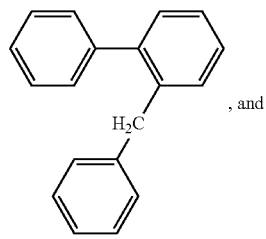, and the Formula 10 is

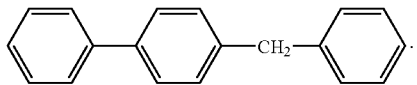.

19. The lithium battery of claim 12, wherein an amount of a mixture of the hydride of the compound represented by the Formula 1 and a compound represented by Formula 6 is at or between 1 and 20% by weight based on the total amount of a mixed solution of the organic solvent and the lithium salt,
wherein the Formula 6 is

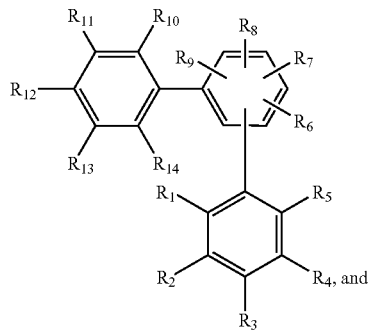

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, halogen, a substituted or unsubstituted C1–C20 alkyl, a substituted or unsubstituted C1–C20 alkoxy, nitro or amine group, and n is an integer between 1 and 10.

20. The lithium battery of claim 12, wherein a mixing ratio of the hydride of a compound represented by the Formula 1 to a compound represented by Formula 6 in the mixture thereof is at or between 10 and 90% by weight, based on a total weight of the mixture,
wherein the Formula 6 is

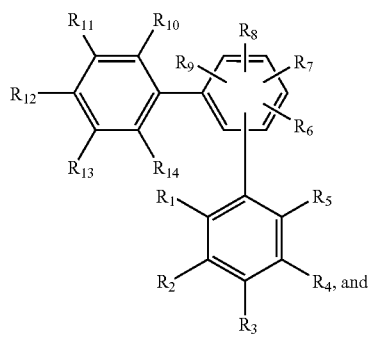

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, halogen, a substituted or unsubstituted C1–C20 alkyl, a substituted or unsubstituted C1–C20 alkoxy, nitro or amine group, and n is an integer between 1 and 10.

21. A lithium battery comprising: a mixing ratio of a compound represented by Formula 1 to a hydride of the compound represented by the Formula 1 in a mixture thereof is at or between 10 and 90% by weight, based on a total weight of the mixture, wherein the formula 1 is

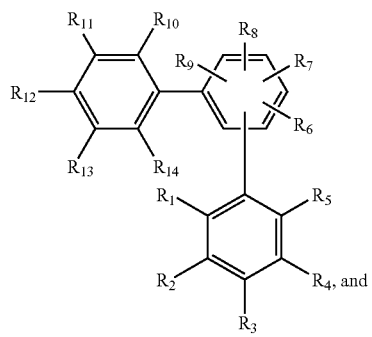

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, hydroxy, halogen, a substituted or unsubstituted C1–C20 alkyl, a substituted or unsubstituted C1–C20 alkoxy, nitro or amine group.

22. A lithium battery comprising:

an anode;

a cathode which intercalates lithium ions with the anode;

a separator disposed between the anode and the cathode; and a non-aqueous electrolyte disposed between the anode and the cathode, the non-aqueous electrolyte comprising:

an organic solvent;

a lithium salt; and a hydride, which is hydrogenated from a compound represented by Formula 1 wherein the Formula 1 is

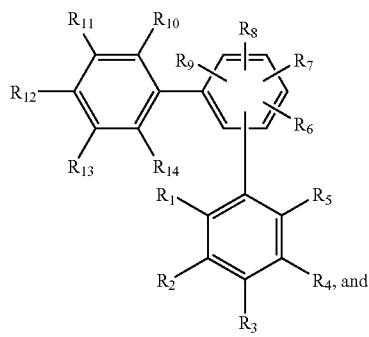

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, hydroxy, halogen, a substituted or unsubstituted C1–C20 alkyl, a substituted or unsubstituted C1–C20 alkoxy, nitro or amine group, wherein a degree of hydrogenation of the hydride of the compound represented by the Formula 1 is at or between 10 and 70%; and a hydride of a compound represented by Formula 6, wherein the Formula 6 is

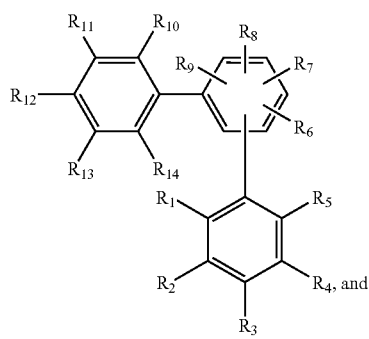

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, halogen, a substituted or unsubstituted C1–C20 alkyl, a substituted or unsubstituted C1–C20 alkoxy, nitro or amine group, and n is an integer between 1 and 10.

* * * * *

UNITED STATES PATENT AND TRADEMARK OFFICE
CERTIFICATE OF CORRECTION

PATENT NO. : 7,049,029 B2  
APPLICATION NO. : 10/271985  
DATED : May 23, 2006  
INVENTOR(S) : Sang-Hoon Choy et al.

It is certified that error appears in the above-identified patent and that said Letters Patent is hereby corrected as shown below:

Column 15, line 9, delete "of" and insert --, which is hydrogenated from-- after hydride.

Column 16, line 51, delete "the".

Column 17, lines 30 and 36, insert --hydride of a-- before "compound".

Column 19, line 25, Column 20, lines 20 and 50 and Column 22, line 30, replace the Formula 6 as printed with the Formula 6 below:

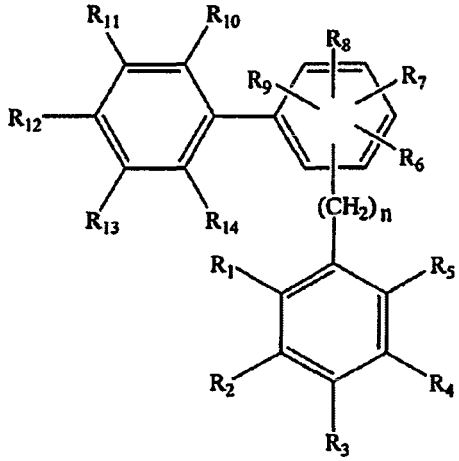

Signed and Sealed this

Twenty-eighth Day of November, 2006

JON W. DUDAS  
*Director of the United States Patent and Trademark Office*